Figure 1:
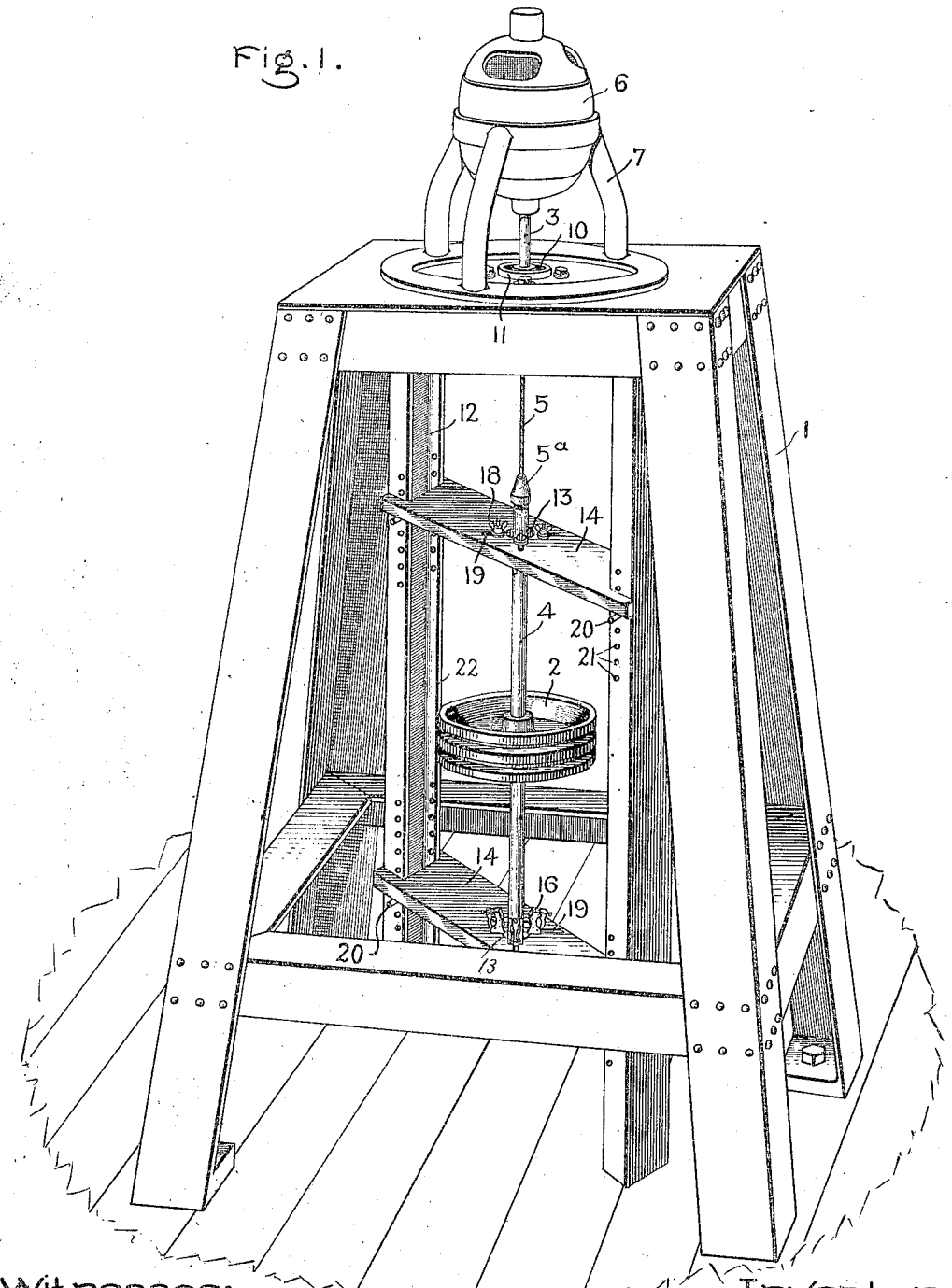

J. G. CALLAN.
BALANCING DEVICE.
APPLICATION FILED NOV. 19, 1904.

922,561.

Patented May 25, 1909.
2 SHEETS—SHEET 1.

Witnesses:

Inventor.
John G. Callan,
By Albert G. Davis
Att'y.

J. G. CALLAN.
BALANCING DEVICE.
APPLICATION FILED NOV. 19, 1904.

922,561.

Patented May 25, 1909.
2 SHEETS—SHEET 2.

Witnesses:
Ewing R. Gurney
Helen A. Ford

Inventor,
John G. Callan,
By Albert G. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

BALANCING DEVICE.

No. 922,561.　　　Specification of Letters Patent.　　Patented May 25, 1909.

Application filed November 19, 1904. Serial No. 233,482.

*To all whom it may concern:*

Be it known that I, JOHN G. CALLAN, a citizen of the United States, residing at Lynn, county of Essex, State of Massachusetts, have invented certain new and useful Improvements in Balancing Devices, of which the following is a specification.

The balancing of bodies intended for high rotative speed, such for example as bucket wheels for steam turbines, armatures, or revolving fields of turbine generators, is a matter that demands utmost precision. The object sought in balancing a bucket wheel or other rotative body, is to distribute the weight so that when the axis of rotation coincides with the geometrical axis, there is no unbalanced weight or couple tending to cause vibration. With this condition perfectly realized rotation is attained with no vibration. With turbines especially, the question of vibration is of vital importance, since the high angular velocity of the bucket wheels and attached rotating parts, would cause a very slight unbalance to give rise to prohibitive vibration.

Bodies have commonly been balanced heretofore by what is known as the static method of balancing. According to this method the unbalanced element or body is mounted, either by means of its permanent shaft or a false one, on parallel ways or rollers with the axis of the shaft horizontal. In this position the heavy side of the element may be determined by the fact that it rolls to the bottom, and may be corrected by permanently adding or subtracting weights by a cut and try process. While this method may be quite satisfactory for a body such as a flat disk, which lies very near a single plane normal to the axis, or for bodies running at low angular velocity, I prefer to employ, for parts having any appreciable axial length, what is termed the dynamic method, and especially for balancing the rotating elements of high speed apparatus, like steam turbines. The particular advantage derived from this method resides first, in the fact that it gives indication of unbalanced couples not discoverable by the static method; since a heavy spot in one plane may statically balance an opposite heavy spot in a plane at some axial distance, while with the dynamic method the opposing centrifugal forces of these weights, acting at the extremities of the arm constituted by their axial distance apart, form a disturbing couple which may be made to indicate its presence by suitable means hereinafter set forth; and second, in the fact that the rotating element may be balanced under conditions which correspond as nearly as possible with those of normal operation. That is to say, the balance can be made under such speed as the body is intended normally to rotate, if desired, or at any other speed. In practicing the method I suspend the element or body to be balanced so that it will rotate on a vertical axis, in which position the force of gravity acts evenly on the body. The shaft with which the element rotates is flexibly suspended so that the axis of rotation is free to assume any position brought about by the distribution of the mass of material. Suitable devices are preferably employed at the extremities of the shaft to prevent motions of nutation, or undue vibration from other causes. The driving power is transmitted through the flexible suspension, at any desired speed. Markings are made on the periphery of the shaft, from which the portion of the revolving mass having the preponderance of weight may be ascertained and a balance effected by adding or subtracting weight at the proper points.

In practice it has been found that at low angular speed a body may appear to be in balance, while at high speed it is not. This is largely because the forces of the unbalanced couple or weight obviously increase with the speed, thus increasing the sensitiveness of the method. With bodies like armatures containing soft parts, a less important contributory cause lies in a possible slight change of actual relation of parts under high centrifugal strain. For this reason it is desirable to balance the said body at an angular speed approximating the conditions of operation. At low speed the marking, or in other words, the point of greatest eccentricity of the body, is adjacent to the heavy point, and as the speed is increased the position of the marking shifts around the shaft in a direction opposite to that of rotation. This shifting of the marking takes place rapidly at first and then more gradually, and as the speed becomes very great the marked or high side closely approximates the light side. This will be best understood by reference to an experiment which I made. A body weighing 600 pounds, which had been previously balanced with careful precision, was employed, and a two ounce mass was secured thereto at a point six inches from the true axis of the body. When rotating at low speed, say 500 revolutions per minute, the marking was, within the error of observation, directly at the heavy point. As the speed increased it traveled in a direction opposite to that of rotation and toward the light point. This change in position of the marking occurred rapidly at first and then more gradually up to 1900 revolutions per minute. From a curve derived from various experiments it is probable that at about 5,000 revolutions per minute the marking and the light point would coincide. Hence knowing the relation between the marking and the light point it is possible in balancing to ascertain with a considerable degree of accuracy the proper point to add or subtract weight for a body of given mass and rotating at a given speed. For instance, in balancing a number of parts of a given weight and at a given speed, the operator learns that the balancing weight should be added at a point located at a certain angular distance from the marking and he mentally carries a rough idea of the way in which the angle changes as the degree of balance becomes better by shifting the balancing weight from point to point. Experience shows that an ordinary operator soon acquires a sufficient degree of expertness to enable him to add the balancing weight very close to the required position. In practice the weight is added at a point located at a greater or less angular distance behind the marking, measured in the direction opposite to rotation. If the balance is to be effected by subtraction of weight, material would be subtracted at a point located at a suitable angular distance in front of the marking in the direction of rotation.

Figure 2:
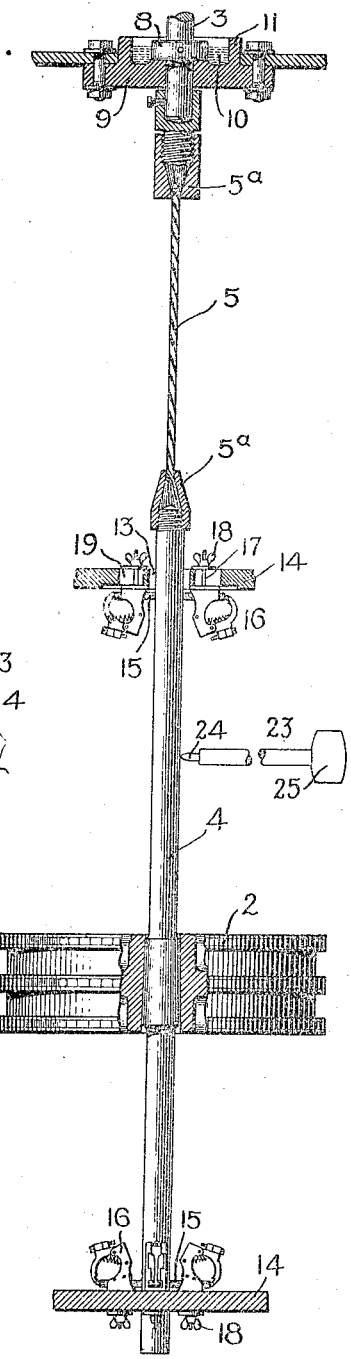
Figure 3:
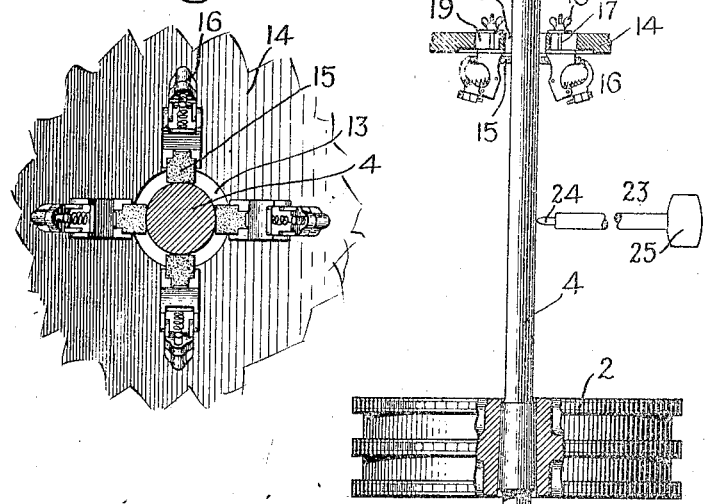
Figure 4:
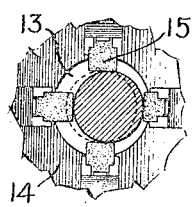

In the accompanying drawings, which illustrate one embodiment of my invention, Figure 1 is a perspective view of a balancing machine; Fig. 2 is a side view, with certain parts in section, of a turbine wheel to be balanced together with the suspending means; and Figs. 3 and 4 are plan views of the devices for damping vibration which are located at the ends of the wheel arbor, the two views showing the arbor in the central and an eccentric position respectively.

Referring to the drawings, 1 represents an upright frame made preferably of angle iron, and firmly secured at its base. Within the frame is suspended the rotating element to be balanced, which may be a turbine bucket wheel, a fly wheel, the rotor of a dynamo electric machine, or the like. The element shown is the bucket wheel 2 of a turbine designed to rotate at high speed and is suspended with its axis vertical so that all portions may be acted upon equally by the force of gravity. On the top of the frame 1 is mounted a rotatable shaft 3, to which is flexibly coupled an arbor 4 carrying the bucket wheel. The arbor may be the permanent shaft of the wheel or a false one as desired. I have found that a wire cable 5 may be used with advantage for flexibly suspending the bucket wheel as this forms a simple and inexpensive means and gives very satisfactory results. The gage of the wire should be selected according to the weight of the element, to have the desired flexibility and tensile strength. To permit interchangeability of the suspension cable for elements having different weights, the cable is removably connected with the rotatable shaft and element, as by means of couplings $5^a$.

The shaft 3 may be driven from any suitable source of power; in the present case it is driven by a direct connected electric motor 6 mounted on the top of the frame in a fixed tripod 7 or other equivalent means. The step bearing for the shaft 3 comprises a shoulder 8, Fig. 2, which rests upon a plate 9, the bearing surface being carefully finished and running in lubricant contained in the well 10 formed by an upright annular flange 11 on the plate.

When the wheel is rotated while out of balance and suspended as described it has a tendency to vibrate considerably. In order to reduce the vibration to some extent so as to partially steady the wheel, damping devices are employed which engage the arbor. These are supported on the supplemental frame 12 arranged within the frame 1. The arbor extends through openings 13 in cross pieces or supports 14 preferably located at the ends thereof. The openings 13 are large enough to permit ample clearance around the arbor so that the latter may rotate eccentrically, while the wheel is in unbalanced condition. Around the openings and engaging the arbor are three or more radially disposed followers 15. I commonly use four of these followers and arrange them in pairs. A greater number can be employed if desired. These followers are suitably guided and are pressed against the arbor by adjustable springs. The working faces of the followers are preferably curved on the same diameter as the shaft and have a tendency to centralize or steady the arbor to a certain extent, but they yield sufficiently to permit the wheel to seek its own axis of rotation. I do not wish to be understood as limiting myself to the specific type of followers shown, especially in machines for balancing heavier parts. In Fig. 4, the cross-sectioned portion represents the arbor in an eccentric position, while the dotted circle represents the true or geometrical position which the arbor assumes when the wheel is balanced. For a specific form of follower or damper I employ carbon brushes and holders, such as are used in dynamo electric machines, which answer the purpose very satisfactorily. The shanks of the holders 16 are each provided with a bolt 17 that extends through an opening in a transverse support of the supplemental frame and is secured by a wing nut 18. In order to employ arbors of different diameters the openings for the bolts are formed as radial slots 19, so as to permit the holders to be adjusted toward and away from the center, as desired. The followers may also be adjusted longitudinally of the arbor by varying the position of the transverse supports. For this purpose the supports are adjustable. A simple method of adjustment is to provide pins 20 as shown in Fig. 1. These pins are adapted to be inserted in the openings 21 in the vertical guide 22 of the supplemental frame.

In operation, the wheel is mounted as shown in Fig. 1 and rotated at a suitable speed, preferably at about the speed at which the wheel is intended normally to rotate. The amount of eccentricity of the axis of the mass depends upon the unequal distribution of material therein. To ascertain the degree of eccentricity, markings are made on the periphery of the arbor on account of its relatively low peripheral speed. In making these markings the instrument 23, shown in Fig. 2, is employed which is a pencil of lead 24 and a weighted holder 25. The inertia of the weight tends to prevent the pencil from following the vibration of the arbor. The markings on the arbor indicate the relative positions of the heavy and light portions of the wheel and these are then compensated for by the addition or subtraction of weight. Fig. 4 shows one position of the arbor when it rotates on an axis at one side of the true axis caused by the unbalanced condition of the wheel, and Fig. 3 illustrates the condition of perfect balance in which the axis of rotation coincides with a geometrical axis and the wheel rotates without vibration.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a balancing machine, the combination of an upright supporting frame, a motor mounted on top of the frame, a vertical shaft mounted in the frame which is driven by the motor and projects downwardly therefrom, a step-bearing on the frame for the shaft, a well or reservoir on the frame for lubricating the bearing, an arbor carrying the element to be balanced, and a flexible cable connected with the lower end of the shaft which flexibly suspends the element and its arbor so that their particles can rotate in planes at right angles to the direction of the force of gravitation, said cable forming the sole means for supporting the weight of the element and the arbor and for imparting rotation thereto from the motor-driven shaft.

2. In a balancing machine, the combination of a supporting frame, a vertical driving shaft mounted thereon, an arbor for the element to be balanced which is located below and in substantial alinement with the shaft, a flexible connection between the arbor and the shaft which supports the entire weight of the arbor and element to be balanced and transmits motion to them, means for damping the vibration of the arbor, and supports for said means which are adjustable longitudinally of the arbor.

3. In a balancing machine, the combination of a supporting frame, a vertical driving shaft mounted on the top thereof, a step-bearing for the shaft, an arbor for the element to be balanced in substantial alinement with the shaft, a cable flexibly connecting the arbor with the driving shaft, adjustable supports at the extremities of the arbor, and adjustable damping devices on said supports which yieldingly engage the arbor.

4. In a balancing machine, the combination of an upright frame, a vertical driving shaft mounted thereon, a flexibly suspended arbor for the element to be balanced which depends from the driving shaft, vertical guides arranged on opposite sides of the arbor, transverse supports adjustable on the guides, and means arranged on said supports which engage with the arbor to reduce vibration.

5. In a balancing machine, the combination of an upright frame, a motor mounted thereon, an arbor for the element to be balanced, a substantially vertical cable suspension which is detachably secured to the motor and arbor, a step-bearing on the frame which supports the weight of the arbor and element to be balanced, and means which tend to center the arbor.

6. In a balancing machine, the combination of an upright frame, a supplemental frame, a flexibly suspended arbor, and damping devices for the arbor mounted on the supplemental frame, comprising radially disposed followers which yieldingly engage the arbor.

7. In a balancing machine, the combination of an upright frame, a supplemental frame fixed relatively thereto, an arbor suspended on the upright frame, means for rotating the arbor, and a device mounted on the supplemental frame at each end of the arbor comprising a plurality of radially disposed carbon followers under spring tension, adjusting devices for the springs, and means for adjusting the position of the followers.

In witness whereof I hereunto set my hand this 17th day of November, 1904.

JOHN G. CALLAN.

Witnesses:
 JOHN A. McMANUS, Jr.,
 DUGALD McK. McKILLOP.